Patented Dec. 12, 1950

2,533,315

UNITED STATES PATENT OFFICE 2,533,315

TREATMENT OF URANIUM CHLORIDES

Aristid V. Grosse, New York, N. Y.

No Drawing. Application January 2, 1941,
Serial No. 372,897

6 Claims. (Cl. 23—14.5)

This invention relates to the separation of uranium pentachloride from other chlorides and oxychlorides of uranium.

In one specific embodiment the present invention comprises a process for separating uranium pentachloride from a mixture containing uranium pentachloride, uranium tetrachloride, and uranium oxychlorides which comprises subjecting said mixture to contact with liquid chlorine to form a solution containing uranium pentachloride, removing said solution from undissolved material, and separating from said solution substantially pure uranium pentachloride.

Uranium pentachloride is obtainable generally in admixture with uranium tetrachloride and sometimes with uranium oxychlorides by a number of processes as the treatment of uranium metal with chlorine or by the reaction of an oxide of uranium with phosgene, with chlorine and carbon, or with chlorine and carbon tetrachloride. The complete conversion of uranium oxychlorides into uranium pentachloride is tedious, and even after complete conversion of other chlorides of uranium into uranium pentachloride, partial decomposition of the desired uranium pentachloride into uranium tetrachloride frequently occurs.

I have found that the separation of uranium pentachloride from uranium tetrachloride and from uranium oxychlorides may be made by the use of my discovery that uranium pentachloride is substantially soluble in liquid chlorine whereas uranium tetrachloride and the uranium oxychlorides are substantially insoluble in this solvent.

The process of this invention is carried out by placing the mixture containing uranium pentachloride and the other contaminating chlorides and oxychlorides of uranium in an apparatus suitable for extracting with liquid chlorine at a temperature usually between about 0° and about 50° C. and under a pressure sufficient to maintain a substantial proportion of said chlorine in liquid phase and generally up to approximately 20 atmospheres. As the liquid chlorine is refluxed over the mixture containing uranium pentachloride, the uranium pentachloride is dissolved to form a solution with deep brown color which on further cooling or by evaporation of chlorine yields substantially pure uranium pentachloride in the form of long shiny crystals with a metallic green luster by reflected light and a reddish brown color by transmitted light. Crystalline uranium pentachloride melts with decomposition at approximately 120° C.

The following example is introduced as characteristic of the practical operation of the present process, although it is presented with no intention of limiting the scope of the invention.

As illustrative of the process, a closed L-shaped tube is provided with liquid chlorine in its lower substantially vertical arm and a mixture of uranium pentachloride and uranium tetrachloride in its upper and substantially horizontal arm. By cooling the upper end of the substantially horizontal arm of the tube as by solid carbon dioxide, the chlorine is refluxed over the uranium chlorides and a brown solution of uranium pentachloride substantially free from uranium tetrachloride is caused to flow into the lower end of the tube. When desired the tube is opened, chlorine is released therefrom, and the uranium pentachloride, thus separated from other materials by the chlorine, is obtained in a substantially pure form.

I claim as my invention:

1. A process for separating uranium pentachloride from a mixture containing uranium pentachloride, uranium tetrachloride, and uranium oxychlorides which comprises subjecting said mixture to contact with liquid chlorine to form a solution containing uranium pentachloride, removing said solution from undissolved material, and separating from said solution substantially pure uranium pentachloride.

2. A process for separating uranium pentachloride from a mixture containing uranium pentachloride, uranium tetrachloride, and uranium oxychlorides which comprises subjecting said mixture to contact with liquid chlorine at a temperature between about 0° and about 50° C. to form a solution containing uranium pentachloride, removing said solution from undissolved material, and separating from said solution substantially pure uranium pentachloride.

3. A process for separating uranium pentachloride from a mixture containing uranium pentachloride, uranium tetrachloride, and uranium oxychlorides which comprises subjecting said mixture to contact with liquid chlorine at a temperature between about 0° and about 50° C. under a pressure of up to approximately 20 atmospheres to form a solution containing uranium pentachloride, removing said solution from undissolved material, and separating from said solution substantially pure uranium pentachloride.

4. A process for separating uranium pentachloride from a mixture containing uranium pentachloride, uranium tetrachloride, and uranium oxychlorides which comprises subjecting said mixture to contact with liquid chlorine at a temperature between about 0° and about 50° C. under a pressure of up to approximately 20 atmospheres to form a solution containing uranium pentachloride, removing said solution from undissolved material, cooling said solution to a temperature below that used in the first step to effect crystallization of uranium pentachloride from a mother liquor containing a relatively small amount of uranium pentachloride, and separating crystalline uranium pentachloride from said mother liquor.

5. A process for separating uranium pentachloride from a mixture containing uranium pentachloride, uranium tetrachloride, and uranium oxychlorides which comprises subjecting said mixture to contact with liquid chlorine at a temperature between about 0° and about 50° C. under a pressure of up to approximately 20 atmospheres to form a solution containing uranium pentachloride, removing said solution from undissolved material, and vaporizing the chlorine from said solution to obtain therefrom substantially pure uranium pentachloride.

6. A process for separating uranium pentachloride from a mixture containing uranium pentachloride and other chlorides and oxychlorides of uranium which comprises subjecting said mixture to contact with liquid chlorine to form a solution containing uranium pentachloride, removing said solution from undissolved material, separating said solution into substantially pure uranium pentachloride and recovered chlorine, and recycling said recovered chlorine to further use in the separation and purification of an additional quantity of uranium pentachloride.

ARISTID V. GROSSE.

REFERENCES CITED

The following references are of record in the file of this patent:

Article by O. Ruff and A. Heinzelmann, Ber. 42, page 495 (1909), copy in Sci. Lib. of Patent Office.

Roscoe, Ber. 7, pages 1131–33 (1874), copy in Sci. Lib. of Patent Office.

Mellor, "Comprehensive Treatise on Inorganic and Theoretical Chemistry," vol. XII, page 86, copy in Sci. Lib.